June 5, 1962  R. G. BLACK  3,037,371
METHODS OF TESTING MOLDABLE MATERIALS
Filed July 25, 1957

INVENTOR
R.G. BLACK
BY C.P. Hamilton
ATTORNEY

United States Patent Office 3,037,371
Patented June 5, 1962

3,037,371
METHODS OF TESTING MOLDABLE MATERIALS
Richard G. Black, Wilkinsburg, Pa., assignor to Western Electric Company, Incorporated, New York, N.Y., a corporation of New York
Filed July 25, 1957, Ser. No. 674,101
4 Claims. (Cl. 73—15.4)

This invention relates to the testing of moldable materials, and more particularly to methods of measuring the seepage characteristics of moldable materials.

In the commercial use of moldable materials such as casting resins, it is frequently expedient to use molds that have mating surfaces or that have apertures in their side walls through which metallic or other inserts to be incorporated in the molded article will extend. Consequently, there is a possibility that excessive amounts of material may seep through the mating surfaces of the mold or through the crevices between the inserts to be molded into the article and the walls of the apertures in the mold.

It is an object of the present invention to provide novel methods for determining the seepage characteristics of molding compositions.

A method illustrating certain features of the invention may comprise subjecting a viscous body of moldable material to a predetermined pressure in a vessel provided with orifices of predetermined size. The moldable material is then subjected to treatment to solidify it, as would be done in normal use of that material, and the amount of material that passes through each of the orifices is then measured to determine the seepage characteristics of the moldable material.

An apparatus for determining seepage characteristics of viscous molding material illustrating certain features of the invention may comprise a hollow member having a series of passages of various predetermined sizes formed in the wall thereof through which molding material placed in the member may seep while the molding material is being cured.

Figure 1:
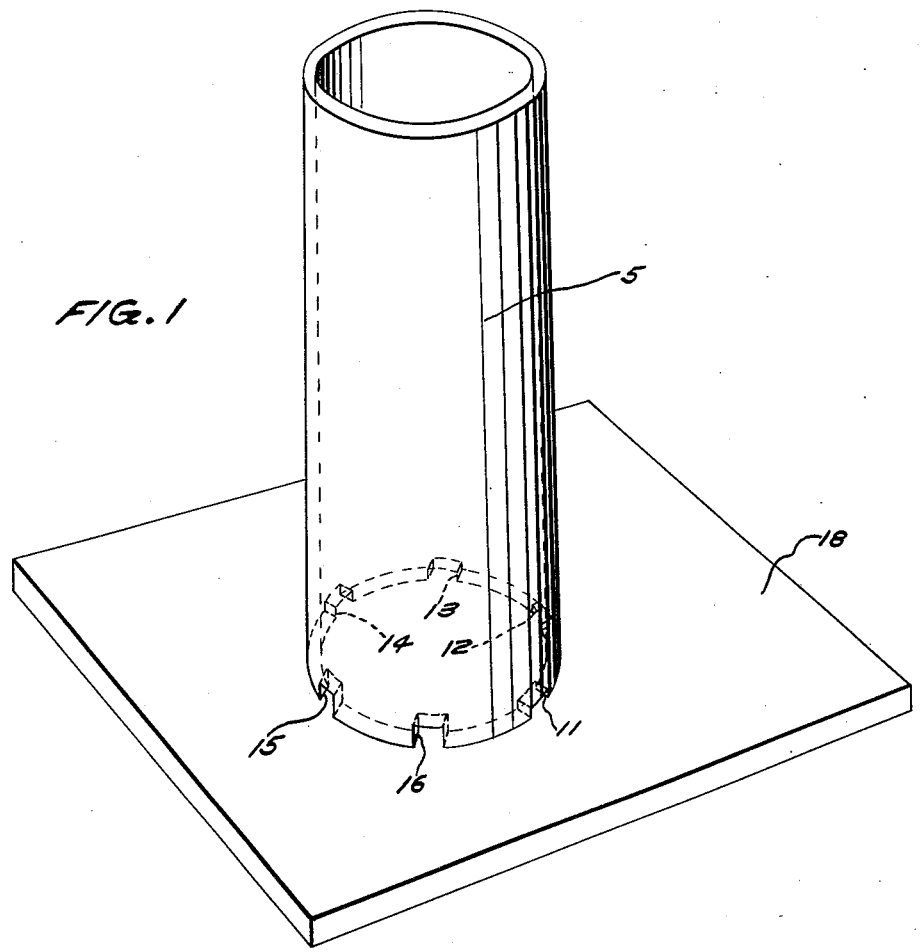
Figure 2:
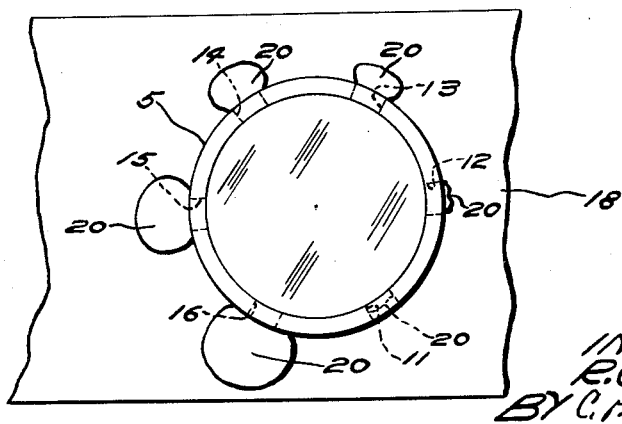

A clear understanding of the invention may be had by reference to the following detailed description, when considered with the accompanying drawing, in which:

FIG. 1 is a perspective view of an apparatus made in accordance with the present invention, and FIG. 2 is a plan view of the apparatus shown in FIG. 1 showing the manner in which molding material seeps through the notches in the tubular member.

Referring now to the drawing, there is illustrated a tubular member 5 which preferably comprises a piece of stainless steel tubing with a series of notches cut in its lower end. The notches are graduated in depth but are all of the same width. In the embodiment of the invention disclosed herein there are six of these notches designated 11, 12, 13, 14, 15 and 16, respectively. The notch 11 is the smallest in depth and the succeeding notches are gradually larger in depth.

The tubular member 5 is set upon a flat surface 18, preferably of plate glass, so that the end of the tubular member 5 will form a tight seal with the glass plate intermediate the notches 11 to 16. The walls of the notches 11 to 16 will cooperate with the plate 18 to define a graduated series of passageways from the interior to the exterior of the tubular member 5 through which molding material placed therein may seep.

In use the tubular member 5 is placed with the notched end down on the plane surface of the plate 18. The molding material to be tested is then poured into the tubular member 5 and cured to effect solidification. After the material becomes solidified, the amount of material which escaped through the passages defined by the upper surfaces of the plate 18 and the walls of the notches 11 to 16 may be measured in a suitable fashion to determine the seepage characteristics of the material.

A specific apparatus and the procedure which has been followed in utilizing the apparatus to test the seepage characteristics of casting resin compositions will now be described.

A piece of steel tubing with a $\frac{1}{16}''$ wall and having an internal diameter of 1.25" was cut to a length of 3". These dimensions were chosen because most laboratory compositions are made up of 100 gram batches, or multiples thereof, and a tube of the size just described will hold such a batch of casting resin unless very dense fillers are used in the casting resin composition. A tube of the height mentioned provides sufficient head so that it will represent the average conditions found in most processes using casting resins. The six notches which were cut into the bottom of the tubular member 5 were spaced 60° apart and milled to a width of 0.25". Notches 11, 12, 13, 14, 15 and 16 were milled longitudinally in the tube to depths of 0.002", 0.003", 0.004", 0.006", 0.008" and 0.010", respectively.

After the apparatus had been prepared by forming the notches 11 to 16 in the tubular member 5 and the tubular member 5 had been positioned on the plate 18, a casting resin composition was poured into the tubular member 5. The resin was then cured in the same manner which is normally followed in doing molding operations. After the curing cycle, the seepage characteristic of the material under test was determined by noting the distance outward in $\frac{1}{100}$ of an inch to which the material flowed from the various notches. If a more accurate comparison is desired, the various solidified flow pieces may be cut off at the outer surface of the tubular member 5 and weighed on an analytical balance. In FIG. 2 the numeral 20 designates material which has seeped through the notches.

The method and apparatus have been used successfully in determining the seepage characteristics for various polyester-styrene casting resin compositions. The following table, given as an example, indicates the distances to which various compositions flowed from the notches 11 to 16, the corresponding weights of the masses that have flowed these distances and the viscosities and formulae of the compositions.

Weight and Distance of Representative Seepage Flows

| Composition | Percent | Depth of Notch, Mils | Width of Flow, Mils | Wt. of Flow (mg.) | Viscosity of Composition (cps.) |
|---|---|---|---|---|---|
| A | | | | | |
| Selectron 5003 | 56.7 | 2 | 40 | 3 | |
| Silica | 39.75 | 3 | 60 | 5 | |
| Glass Fiber, $\frac{1}{32}''$ | 3.0 | 4 | 60 | 7 | 2,900 |
| Titanium Dioxide | 0.25 | 6 | 80 | 17 | |
| | | 8 | 250 | 116 | |
| TBH | 0.3 | 10 | 320 | 296 | |
| B | | | | | |
| Selectron 5003 | 50.0 | 2 | 70 | 21 | |
| Suspenso | 49.75 | 3 | 130 | 20 | |
| | | 4 | 180 | 186 | |
| TBH | 0.25 | 6 | 380 | 580 | 4,200 |
| | | 8 | 570 | 1,410 | |
| | | 10 | 770 | 3,005 | |
| C | | | | | |
| Selectron 5003 | 50.0 | 2 | 30 | 3 | |
| Suspenso | 46.75 | 3 | 60 | 11 | |
| Glass Fiber, $\frac{1}{32}''$ | 3.0 | 4 | 70 | 17 | 4,250 |
| | | 6 | 150 | 25 | |
| TBH | 0.25 | 8 | 400 | 528 | |
| | | 10 | 410 | 545 | |
| D | | | | | |
| Selectron 5003 | 50.0 | 2 | 30 | 2 | |
| Suspenso | 44.75 | 3 | 50 | 5 | |
| Glass Fiber, $\frac{1}{32}''$ | 5.0 | 4 | 30 | 5 | 4,900 |
| | | 6 | 100 | 19 | |
| TBH | 0.25 | 8 | 120 | 42 | |
| | | 10 | 350 | 426 | |

*Weight and Distance of Representative Seepage Flows—Continued*

| Composition | Percent | Depth of Notch, Mils | Width of Flow, Mils | Wt. of Flow (mg.) | Viscosity of Composition (cps.) |
|---|---|---|---|---|---|
| E | | | | | |
| Selectron 5003 | 50.0 | 2 | 10 | 1 | |
| Suspenso | 34.75 | 3 | 30 | 1 | |
| Wollastonite F-1 | 15.0 | 4 | 30 | 1 | 5,400 |
| | | 6 | 40 | 2 | |
| TBH | 0.25 | 8 | 80 | 16 | |
| | | 10 | 390 | 410 | |
| F | | | | | |
| Marco 28C | 50.0 | 2 | 30 | 2 | |
| Suspenso | 34.75 | 3 | 40 | 4 | |
| Wollastonite F-1 | 15.0 | 4 | 40 | 5 | 6,400 |
| | | 6 | 70 | 9 | |
| DDM | 0.25 | 8 | 70 | 75 | |
| | | 10 | 330 | 292 | |

In the table "DDM" is methyl ethyl ketone peroxide—60% and "TBH" is tertiary butyl hydroperoxide—70%. "Selectron 5003" is a polyester-styrene casting resin which is a product of the Pittsburgh Plate Glass Company, sold under the trade name "Selectron 5003." "Marco 23C" is the trademark designating a polyester-styrene casting resin composition manufactured by the Marco Division of the Celanese Corporation of America.

Formula A comprises a polyester resin casting composition which is substantially the same as one that has been used for the manufacture of terminal strips and cable terminals. The difference between the composition according to Formula A and the one used for terminal strips is that the glass fiber content of this composition is 3% instead of 5% which was used in the terminal strips. This decrease in the content of glass fiber was made to increase the flow from the test device so that this composition could be compared with others.

Formula B contains no glass fiber but utilizes a very finely ground calcium carbonate filler sold under the trademark "Suspenso." Although the viscosity of this composition is nearly 50% higher than the composition given in Formula A, the fineness of the filler and the lack of reinforcing fiber allow the composition to seep through the notches in the apparatus to a markedly greater extent than did the composition of Formula A.

Formula C also uses "Suspenso" as a filler but contains the same proportion of glass fiber as does Formula A. It was noted that with Formula C the glass fiber controls the seepage markedly. However, the seepage is somewhat more than that of Formula A, since the "Suspenso" is apparently finer than the silica used in Formula A and seeps through to a greater extent. This is true although the viscosity of Formula C is still much higher than the viscosity of Formula A.

Formula D is like Formula C except that it contains more glass fiber. The seepage through all but the largest notch 11 is markedly reduced when this formula is tested.

Formula E uses a reinforcing fiber sold under the trademark "Wollastonite." This material does not have the same mechanical strength that glass fibers have and required about three times the weight percent required for glass fibers in order to give equivalent mechanical strength to the articles being molded. It will be apparent that using this material reduces the seepage very markedly. The viscosity of the composition is not increased as much when this material is used as it would be with an increase in the glass fiber content.

Formula F is similar to Formula E except that a different base resin was used having a higher content of inhibitor. This resin will not gel at room temperature even when methyl ethyl ketone peroxide is used instead of the slower acting tertiary butyl hydroperoxide. The effect of the increased gel time is noticeable in the increased seepage up to the largest notch of the apparatus. At this point the higher viscosity of Formula F compared with Formula E apparently becomes the controlling factor.

In testing the compositions of Formulae A to F, with the exception of Composition F, the compositions were allowed to gel at room temperature before being cured in a forced-convection oven for one hour at 150° F. followed by an additional hour at 250° F. The composition of Formula F did not gel either at room temperature or at 150° F. It solidified only when heated at 250° F. This accounts for the increased seepage of Formula F over that of Formula E.

By the utilization of the process and apparatus described herein, a simple, dependable and inexpensive means is provided for evaluating various compositions to determine what combination of fillers, fibers and resins are most effective in reducing seepage. After such determination, only the most effective composition need then be compared in actual molds under operating conditions. In the detailed description of the apparatus and the method given herein, the dimensions selected were chosen as a matter of convenience. The dimensions for the smaller notches correspond to the clearances normally provided in molds used commercial. The larger notches were chosen to exaggerate any condition that might be expected to occur in commercial practice so that a determination could be made of how far seepage could be controlled under extreme conditions.

The specific dimensions given hereinbefore and the specific compositions are cited only by way of example. In testing other materials by means of the present invention, various modifications may be made without departing from the scope of the invention.

What is claimed is:

1. A method of measuring the seepage characteristic of plastic material that is capable of solidification upon application of heat which comprises the steps of pouring a predetermined sized batch of said plastic material into a stationary vessel having orifices of different sizes adjacent to the bottom thereof to flow a different quantity of said material through each of said orifices, heating the material to solidification, and thereafter measuring the quantity of material that has passed through each of said orifices during the treatment to determine the seepage characteristic of the material.

2. A method of determining the seepage characteristic of fluid moldable material that is capable of solidification upon application of heat which comprises freely flowing a predetermined sized batch of said material into a stationary container having a plurality of orifices of predetermined various sizes at its bottom edge whereby a different amount of said material seeps through each of said orifices onto a flat non-tacky surface that extends outwardly from said container at the bottom of each of said orifices, heating the material to solidify the material that remains in the container and that has seeped onto said surface, and thereafter measuring the distance that the material has flowed through each of said orifices.

3. The method of determining seepage characteristics of a viscous material subject to solidification upon application of heat, which comprises the steps of freely flowing said material in a unitary path, separating said flowing material into a plurality of unequal unconfined flow paths, heating said material flowing in said flow paths to cure and solidify said material, severing each of said solidified unequal flow paths of material at the point of separation of said unequal flow paths from said unitary path, and separately weighing said severed solidified material of each of said unequal flow paths to determine the seepage characteristics of the material.

4. The method of examining seepage of a viscous material subject of solidification upon application of heat from differently sized slots provided in one edge of a hollow cylinder to determine seepage characteristics of the material, which comprises the steps of placing and holding the cylinder in a fixed position on a non-tacky surface so that the slots are enclosed by the surface, pouring a predetermined batch of said viscous material into said cylinder so that the batch flows downwardly to said slots and a different size portion of the batch seeps radially through each of said slots onto said surface, heating said batch of material to cure and solidify the material within the cylinder and also the different sized portions of the material that have seeped through each slot onto said surface, and measuring the length of each portion of said material that has seeped onto said surface to determine the seepage characteristic of the material.

References Cited in the file of this patent

UNITED STATES PATENTS

| | | |
|---|---|---|
| 1,988,597 | Karrer | Jan. 22, 1935 |
| 2,066,016 | Rossi et al. | Dec. 29, 1936 |
| 2,112,190 | Dillon et al. | Mar. 22, 1938 |
| 2,243,674 | Hoch | May 27, 1941 |
| 2,660,051 | Dowling | Nov. 24, 1953 |

FOREIGN PATENTS

| | | |
|---|---|---|
| 443,398 | Great Britain | Feb. 27, 1936 |